M. E. GROSS & J. L. HOWLAND.
BELT FASTENER.
APPLICATION FILED FEB. 9, 1915.

1,245,099.

Patented Oct. 30, 1917.

Witnesses
F. H. Shallenberger
F. H. Hoster

Inventors
J. L. Howland.
M. E. Gross.
By Victor J. Evans
Attorney

UNITED STATES PATENT OFFICE.

MARGARET E. GROSS, OF PERKINSVILLE, AND JOSEPH L. HOWLAND, OF BUFFALO, NEW YORK.

BELT-FASTENER.

1,245,099.  Specification of Letters Patent.  Patented Oct. 30, 1917.

Application filed February 9, 1915. Serial No. 7,067.

*To all whom it may concern:*

Be it known that we, MARGARET E. GROSS and JOSEPH L. HOWLAND, citizens of the United States, residing at Perkinsville, in the county of Steuben and State of New York, and Buffalo, in the county of Erie and State of New York, respectively, have invented new and useful Improvements in Belt-Fasteners, of which the following is a specification.

The invention relates to belt fasteners, and has for an object to provide a belt fastener for use in securing the ends of belts which are generally used to connect a driving and driven member as in sewing machines.

The invention contemplates, among other features, the provision of a fastener which, when the belt is subjected to tension, will not tear away from or have the ends of the belt torn from the fastener and which, furthermore, can be reapplied to the ends of the belt to fasten the same after the same had been previously applied thereto and removed to permit of shortening the belt. The usual wire like fastener employed to connect the ends of small belts tends to have the ends of the belts torn from it in view of the fact that the ends of the belt are greatly weakened by applying this mode of fastener thereto and furthermore the belt should necessarily have to be cut down in length and it is ofttimes impossible to properly connect the fastener with the slightly shortened ends. In the use of the known form of fastener the gap between the ends of the belt, when the belt is in use, results in a hammering as the fastener passes over the driven member. To obviate this we employ a fastener which has gripping means that do not pass entirely through the substance or material of the belt and which encircles the ends of the belt to securely grip the same and hold them together, the fastener, when applied to the belt and secured thereon, being adapted to almost fit flush with the periphery of the belt and form a component part thereof.

In the further disclosure of the invention reference is to be had to the accompanying drawings, constituting a part of this specification, in which similar characters of reference denote corresponding parts in all the views, and in which.

Figure 1:
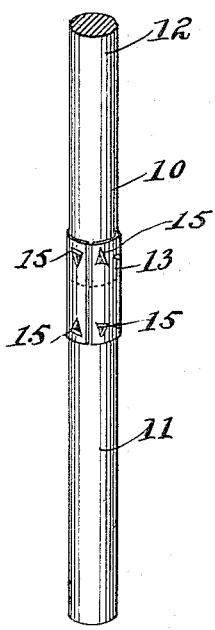
Figure 1 is a fragmentary perspective view of a belt showing the ends secured with our device.
Figure 2:
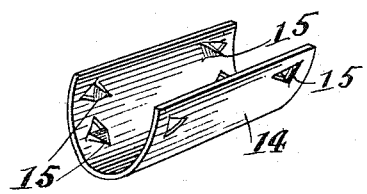
Fig. 2 is a perspective view of the device removed from a belt.
Figure 3:
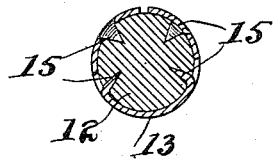
Fig. 3 is a horizontal sectional view taken through the device.

Referring more particularly to the views, we disclose the ends 10 and 11 of a belt 12, with our fastener indicated by the numeral 13 connecting the ends 10 and 11. The fastener consists, more particularly, of a single piece of sheet metal 14 bent in a substantially semi-circular form and having pairs of gripping lugs 15 struck therefrom and extending inwardly, with one gripping lug in each pair extending laterally to the other gripping lug in each pair so that some of the gripping lugs will lie in the plane of the belt, whereas one of the gripping lugs in each pair will extend transversely to the plane of the belt or perpendicularly thereto.

When the two ends of the belt have been brought together or as near together as possible the fastener 13 is applied thereto to partially encircle the ends, and it will be seen that a plurality of the pairs of gripping lugs will be pressed into each end of the belt when pressure is applied to the fastener to cause the same to completely encircle the ends of the belt so that the gripping lugs, extending into the material of the belt, will not only prevent the ends from spreading apart but will tend to prevent a turning or torsion of the ends of the belt and which ofttimes occurs in belts on certain kinds of machinery, thus resulting in the tearing apart of the ends when the ordinary fastener is used, whereas with our device a considerable torsion exerted on the belt ends will fail to remove or tear the belt ends from the gripping lugs extending into the belt and which are disposed to have their longer edges lying in the plane of the belt, the other gripping lugs having their longitudinal edges transverse of the belt and preventing the tearing apart of the ends.

From the foregoing description it will be seen that the fastener described, consisting of a single piece of material, preferably metal, can be cheaply manufactured, the lugs being struck from the body of the metal as mentioned, and it will be clear that the fastener will effectively perform the function for which it is desired and that it can be readily and quickly applied to the belt ends.

Having thus described our invention, we claim:

As a new article of manufacture, a belt fastener comprising a single piece of flat material bent in substantially semi-circular form, and pairs of gripping lugs inwardly struck from said piece of material and projecting diametrically thereto, one gripping lug in each pair extending laterally to the other gripping lug in each pair and disposing certain of said lugs in a plane with the belt to which the article is connected to prevent any longitudinal movement of the fastener upon the belt ends, the other of said lugs being disposed transversely to the plane of the belt for preventing any circumferential movement of the device, and further preventing the separation of the longitudinal edges of the fastener.

In testimony whereof we affix our signatures in presence of two witnesses.

MARGARET E. GROSS.
JOSEPH L. HOWLAND.

Witnesses for M. E. Gross:
JAMES H. HOPKINS,
L. M. HANSON.

Witnesses for J. L. Howland:
JAMES L. CLARK,
OTTO GRANTLER.